3,105,035
CONSTRUCTION OF NUCLEAR FUEL ELEMENTS

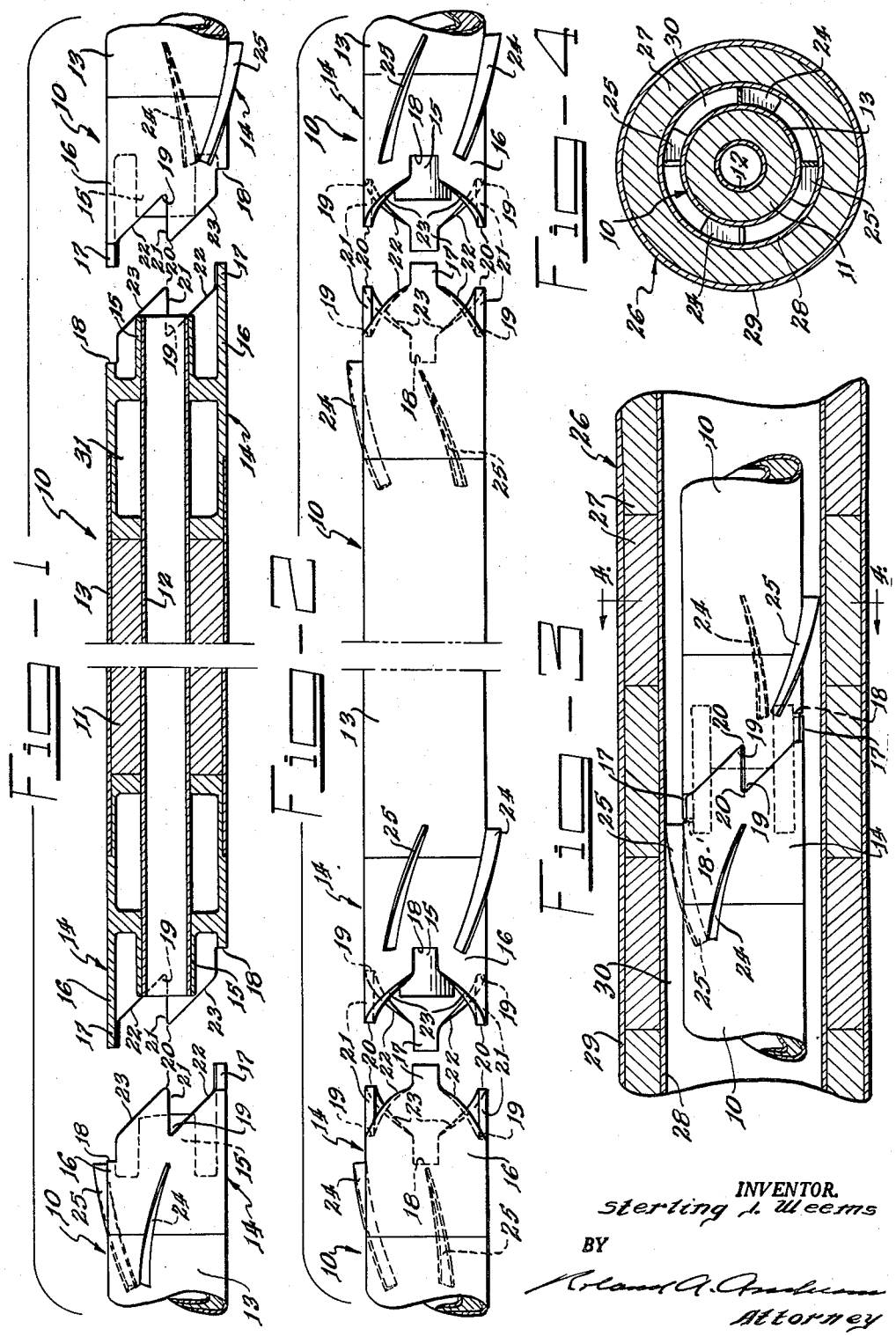

Sterling J. Weems, Safety Harbor, Fla., assignor to the United States of America as represented by the United States Atomic Energy Commission
Filed Oct. 2, 1961, Ser. No. 142,440
5 Claims. (Cl. 204—193.2)

This invention relates to the supporting of nuclear-fuel elements in a coolant passage, and more specifically to a construction of inner and outer fuel elements in which the outer fuel element is tubular and forms the coolant passage in which the inner fuel elements are tightly supported in radially spaced relation to the outer fuel element.

It is well known to provide radial ribs on fuel elements for supporting them in a coolant passage in a reactor in radially spaced relation to the passage so that an annular space is formed between the fuel elements through which space coolant may be flowed for removing heat from the fuel elements. See, for example, FIG. 39 and column 43 of Fermi et al. Patent 2,708,656, dated May 17, 1955. In this construction, the ribs are provided on all sides of the fuel elements. If they are to be held tightly in the coolant passages, it may be very difficult to insert the fuel elements in the passages without damaging the ribs and passages. If the fuel elements become distorted or enlarged with reactor operation, it may be very difficult to remove them.

The present invention overcomes these drawbacks by providing ribs on fuel elements only over a limited peripheral region and specially shaped mating ends on the fuel elements. The fuel elements are easily inserted in a coolant passage because of the limited peripheral involvement of the fuel elements with ribs. Yet when the fuel elements are brought into tight end-to-end engagement with one another in the coolant passage, they are held tightly against radial movement in the passage, since the meshing of adjacent mating ends of fuel elements holds the same against relative rotation and places the ribs of one of said adjacent ends in general peripheral opposition to the ribs of the other of said adjacent ends. This arrangement of fuel elements, of the present invention, is specially suited to the superheater region of a boiling-water reactor in which certain inner tubular fuel elements have the specially shaped meshing ends just described and are located within an outer tubular fuel element, so that steam being superheated passes through the inner fuel elements and between the inner and outer fuel elements.

In the drawings:

FIG. 1 is an exploded view, partly in section and partly in elevation, of a series of fuel elements of the present invention;

FIG. 2 is an exploded elevational view of the series of fuel elements rotated 90° from FIG. 1;

FIG. 3 is a sectional view showing an outer fuel element and two fuel elements of the present invention positioned therein; and FIG. 4 is a sectional view taken on the line 4—4 of FIG. 3.

As shown in FIG. 1, a fuel element 10 of the present invention comprises a fissionable tubular core 11, an inner tubular jacket 12, an outer tubular jacket 13, and end members 14, which cooperate with the jackets 12 and 13 in enclosing and sealing the fissionable core 11. The jackets 12 and 13 engage the interior and exterior of the core 11 and overlap, and are sealingly bonded to, the end members, by being brazed or welded thereto. Each end member 14 has an internal tubular portion 15 the end of which is perpendicular to the axis of the fuel element 10. The interior and exterior of the fuel element are circular and cylindrical.

As shown in FIGS. 1 and 2, each end member 14 has an external or peripheral tubular portion 16, which has a projection 17 having parallel sides and an end perpendicular to the axis of the fuel element 11, and also a blunt recess 18, which is of the same width as the blunt projection 17 and a slightly greater length and is peripherally spaced 180° therefrom. Each side of the blunt projection 17 is connected with a side of the blunt recess 18 by a pointed recess 19 and a pointed projection 20. Each recess 19 and its associated projection 20 has a common side 21 extending longitudinally of the fuel element 10, and also separate sides 22 and 23, respectively, extending generally spirally of the fuel element 10, and more particularly, being formed by parallel planes extending at about 45° to a plane containing the axis of the fuel element 10 and intersecting the said plane in lines perpendicular to the axis of the fuel element. Each recess 19 is slightly larger than the associated projection 20. Each end member has two pointed projections 20 and two pointed recesses 19.

At each end member 14 there are provided two radial spiral ribs 24 and 25, which extend about 30° along the exterior of the end member and the outer jacket 13 and have corresponding ends peripherally spaced about 90° from one another. The ribs 24 and 25 are bonded to the end member 14 and the outer jacket 13 by welding or brazing and are coextensive when projected on the axis of the fuel element 10.

The various parts just described of one end member 14 of a fuel element 10 are, respectively, spaced 180° from the other end member 14 of the same fuel element. Thus, as seen in FIG. 2, the left-hand blunt recess 18 of the middle fuel element 10 is in front, and the right-hand blunt recess 18 is at the rear, while, the left-hand blunt projection 17 is at the rear, and the right-hand blunt projection is in front. Moreover the right-hand ribs 24 and 25 are generally at the rear and the left-hand ribs are generally in front. The same thing is true when one considers adjacent ends of adjacent fuel elements 10.

Stated in another way, the recesses 18 and 19 and projections 17 and 20 of one end member 14 of one fuel element 10 correspond in position, respectively, to the projections 17 and 20 and recesses 18 and 19 of the adjacent end member 14 of an adjacent fuel element 10. Thus, as shown in FIG. 3, the recesses 18 and 19 of each of the adjacent ends of the two fuel elements 10 shown, respectively, receive projections 17 and 20 of the other of said adjacent end members 14 when the fuel elements are moved together. The projections 17 and 20 and recesses 18 and 19 permit the two adjacent end members 14 to go together or mesh in only one relative angular position of two dajacent fuel elements 10. Since the ribs 24 and 25 are fixed to the fuel elements 10, the ribs on one of the adjacent ends of two adjacent fuel elements are fixed with respect to the ribs 24 and 25 on the other of the adjacent ends of the fuel elements, more particularly, at about a 180° spacing, respectively, when considered with respect to right-hand ends or left-hand ends as viewed in FIG. 3.

A series of fuel elements 10 is adapted to fit together end to end as shown for two fuel elements in FIG. 3, inside an outer tubular fuel element 26, which comprises a fissionable tubular core 27, and inner and outer tubular jackets 28 and 29 tightly embracing the core 27 interiorly and exteriorly. The interior and exterior of the fuel element 26 are circular and cylindrical. As shown in FIG. 4, the ribs 24 and 25 of adjacent fuel elements 10 are peripherally spaced thereabout so as tightly to mount the fuel elements 10 in the outer fuel element 26. Between the fuel elements 10 and 26 there is formed an annular cylindrical coolant passage 30.

The fuel elements 10 are individually inserted in the outer fuel element 26. Each fuel element 10 can be moved easily into the outer fuel element 26, because at each end member 4 of the fuel element, there are only two ribs 24 and 25, which have a total peripheral spacing of about 120° measured from the right-hand end of one rib 24 or 25 to the left-hand end of the other rib 25 or 24, since each rib 24 or 25 extends about the fuel element for about 30° and, as previously stated, adjacent ends of one set of ribs 24 and 25 are spaced about 90° from one another. The total peripheral involvement of a pair of ribs 24 and 25 on a certain end member 14 of a fuel element 10 is appreciably less than 180°, or more particularly, about 120°. When adjacent end members 14 of adjacent fuel elements 10 are brought together, they can mesh in only one relative angular position and must be in alignment, because the blunt recesses 18 must receive the blunt projections 17, and the pointed recesses 19 must receive the pointed projections 20. Thus for the assembled adjacent end members 14 of a pair of adjacent fuel elements 10, the four ribs 24 and 25 must be distributed peripherally about the fuel elements, as shown in FIG. 4, and a tight fit of the assembled fuel elements 10 must occur. When the recesses 18 and 19 receive the projections 17 and 20 as just stated, the ends of internal tubular portions 15 of adjacent end members 14 abut one another.

An assembly of an outer fuel element 26 and a series of aligned inner fuel elements 10 is adapted to receive saturated steam at one end and discharge it as superheated steam at the other end after the steam flows lengthwise of the fuel elements through the inner fuel elements 10 and through the annular passage 30 formed between the inner and outer fuel elements 10 and 26. The assembly of fuel elements 10 and 26 is adapted to be positioned vertically, along with functionally similar other fuel-element assemblies parallel thereto and spaced therefrom, in a boiling-water reactor in which water is heated to saturated steam outside the outer fuel elements 26, and perhaps not directly outside the same, and the saturated steam is converted to superheated steam by passing through the inner and outer fuel elements 10 and 26. The boiling-water reactor in question is more fully disclosed in Report GNEC–136, of General Nuclear Engineering Corporation, available from the Office of Technical Services, Department of Commerce, Washington 25, D.C. The portions of this report relating to the claimed subject matter of the present application, namely, page 36 and FIGS. 5 and 7 of the report, were disclosed by applicant as his invention to General Nuclear Engineering Corporation, his employer, before the report was written. Reference is also made to Untermyer Patent 2,936,273, dated May 10, 1960, for a basic disclosure of boiling-water reactors.

Each of the fissionable cores 11 and 27 may be formed of $UO_2$ slightly enriched in the isotope $U^{235}$. These cores may be formed of a series of relatively short tubular pellets or by vibratory compaction of $UO_2$ powder. The jackets 12, 13, and 29, and members 14, and ribs 24 and 25, may be formed of Type 347 stainless steel, and the jacket 28, of an alloy composed of 79.5% nickel by weight, 13.0% chromium, 0.25% silicon, 0.08% carbon, and 0.20% copper.

The ribs 24 and 25 on the inner fuel elements 10 are spiral so as to maintain a helical flow of steam in the annular space 30 between the inner and outer fuel elements 10 and 26. The purpose of the helical-flow pattern is to reduce the thermal-distortion effects in the space 30 caused by any nonuniform azimuthal heating of the inner fuel elements 10.

Aligned inner fuel elements 10 are held in meshing engagement by axial pressure applied to the fuel elements, for example, by a spring (not shown) located at the end of the series of aligned fuel elements 10 where the saturated steam is admitted, which is at a relatively low temperature.

It will be understood that this invention is not to be limited to the details given herein but that it may be modified within the scope of the appended claims.

What is claimed is:

1. A cylindrical nuclear-fuel element having adjacent one end a plurality of generally longitudinal radial ribs peripherally spaced considerably less than 180° from one another, said one end of the fuel element having at the periphery a blunt longitudinal projection having spaced generally parallel sides and an end connecting the sides, said one end of the fuel element further having at the periphery a blunt longitudinal recess having the same width as the projection and at least as great a length and spaced therefrom longitudinally of the fuel element and peripherally thereof by 180°, each side of the blunt projection being connected with a side of the blunt recess by a pointed recess and a pointed projection having a common side extending longitudinally of the fuel element and separate sides each extending spirally of the fuel element, the other end of the fuel element having two generally longitudinal ribs, a blunt projection, a blunt recess, two pointed projections, and two pointed recesses similar to those of the said one end of the fuel element but displaced therefrom, respectively, about the fuel element.

2. The fuel element specified in claim 1, each of the ribs extending spirally of the fuel element.

3. The combination with means providing a cylindrical passage, of two fuel elements as specified in claim 1, the fuel elements being arranged in the cylindrical passage with their adjacent ends meshing, the blunt projections, blunt recesses, pointed projections, and pointed recesses of the adjacent end of one fuel element, respectively, receiving the blunt recesses, blunt projections, pointed recesses, and pointed projections of the adjacent end of the other fuel element, the ribs near the said adjacent end of one fuel element being spaced about 180° from the ribs near the said adjacent end of the other fuel element.

4. The fuel element specified in claim 1 having a central longitudinal passage, the blunt and pointed projections and recesses being formed only at the periphery of the fuel element, the portion of each end of the fuel element directly surrounding the central passage being perpendicular to the axis of the fuel element axis.

5. An assembly comprising an outer tubular fuel element, and two fuel elements as specified in claim 4, the fuel elements being arranged in the cylindrical passage with their adjacent ends meshing, the blunt projections, blunt recesses, pointed projections, and pointed recesses of the adjacent end of one fuel element, respectively, receiving the blunt recesses, blunt projections, pointed recesses, and pointed projections of the adjacent end of one fuel element being spaced about 180° from the ribs near the said adjacent end of the other fuel element, the portions of the said adjacent ends directly surrounding the central passages of the fuel elements being in abutment with one another.

(References on following page)

References Cited in the file of this patent

UNITED STATES PATENTS

| | | |
|---|---|---|
| 329,326 | Mark | Oct. 2, 1885 |
| 2,471,759 | Lowrey | May 31, 1949 |
| 2,490,316 | Ostrak | Dec. 6, 1949 |
| 3,030,291 | Butler et al. | Apr. 17, 1962 |

FOREIGN PATENTS

| | | |
|---|---|---|
| 1,166,835 | France | June 30, 1958 |

OTHER REFERENCES

GNEC-136, A 200 Mw(e) Boiler-Superheater Reactor Preliminary Design, October 25, 1960, page 36 and FIGS. 5 and 7.

GNEC-138, Nuclear Superheat Development Program, November 1960, pages 9, 10, 96 and 98.

GNEC-150, Steam-Cooled Power Reactor Evaluation, April 30, 1961, pages V-28 and V-29 and FIGS. V-5 and V-7.